United States Patent
Wang et al.

(10) Patent No.: US 9,723,617 B2
(45) Date of Patent: Aug. 1, 2017

(54) METHOD AND DEVICE FOR PROCESSING INTERFERENCE

(71) Applicant: Huawei Technologies Co., Ltd., Shenzhen (CN)

(72) Inventors: Rui Wang, Shenzhen (CN); Rongdao Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 62 days.

(21) Appl. No.: 14/731,122

(22) Filed: Jun. 4, 2015

(65) Prior Publication Data
US 2015/0271831 A1    Sep. 24, 2015

Related U.S. Application Data

(63) Continuation of application No. PCT/CN2013/083359, filed on Sep. 12, 2013.

(30) Foreign Application Priority Data

Dec. 5, 2012  (CN) .......................... 2012 1 0514520

(51) Int. Cl.
*H04W 72/08*    (2009.01)
*H04B 7/04*     (2017.01)
(Continued)

(52) U.S. Cl.
CPC ........ *H04W 72/082* (2013.01); *H04B 7/0421* (2013.01); *H04L 25/03891* (2013.01);
(Continued)

(58) Field of Classification Search
CPC . H04W 72/082; H04W 76/023; H04W 92/18; H04B 7/0421; H04B 17/345;
(Continued)

(56) References Cited

U.S. PATENT DOCUMENTS 7,835,700 B2    11/2010  Zeira
8,107,883 B2    1/2012   Peng et al.
(Continued)

FOREIGN PATENT DOCUMENTS

CN      1527620 A      9/2004
CN    101124803 A      2/2008
(Continued)

OTHER PUBLICATIONS

Lei et al., "Operator Controlled Device-to-Device Communications in LTE-Advanced Networks," IEEE Wireless Communications, pp. 96-104, Institute of Electrical and Electronics Engineers, vol. 19, Issue 3, New York, New York (Jun. 2012).
(Continued)

*Primary Examiner* — Chi H Pham
*Assistant Examiner* — Shailendra Kumar
(74) *Attorney, Agent, or Firm* — Leydig, Voit & Mayer, Ltd.

(57) ABSTRACT

Embodiments of the present invention provide a method and a device for processing interference, wherein according to a first demodulation reference signal DMRS pilot symbol carried by a first subcarrier used by an uplink user equipment, an interference channel matrix of an uplink interference channel from the uplink user equipment to a D2D receiving end is measured, wherein the first subcarrier is a subcarrier shared by a D2D transmitting end and the uplink user equipment; a null space matrix of the uplink interference channel is calculated according to the interference channel matrix; and the signal received by the D2D receiving end via the first subcarrier is processed by using the null space matrix to eliminate an interference signal which comes from the uplink user equipment in the signal.

20 Claims, 2 Drawing Sheets

--- according to a first demodulation reference signal DMRS pilot symbol carried by a first subcarrier used by an uplink user equipment, an interference channel matrix of an uplink interference channel of the uplink user equipment to a D2D receiving end is measured, wherein the first subcarrier is a subcarrier shared by a D2D transmitting end and the uplink user equipment.    — 101 a null space matrix of the uplink interference channel is calculated according to the interference channel matrix    — 102 by using the null space matrix, a signal which comes from a D2D transmitting end, which is received by the D2D receiving end via the first subcarrier, is processed to eliminate the interference signal, which comes from the uplink user equipment, in the signal    — 103

(51) Int. Cl.
*H04B 17/345* (2015.01)
*H04W 76/02* (2009.01)
*H04L 25/03* (2006.01)
*H04W 92/18* (2009.01)
*H04L 5/00* (2006.01)

(52) U.S. Cl.
CPC ............ *H04W 76/023* (2013.01); *H04B 7/04* (2013.01); *H04B 17/345* (2015.01); *H04L 5/0023* (2013.01); *H04L 5/0032* (2013.01); *H04L 5/0048* (2013.01); *H04W 92/18* (2013.01)

(58) Field of Classification Search
CPC ... H04B 7/04; H04L 25/03891; H04L 5/0032; H04L 5/0023; H04L 5/0048
See application file for complete search history.

(56) References Cited

U.S. PATENT DOCUMENTS

| | | | |
|---|---|---|---|
| 2011/0255431 A1 | 10/2011 | Wang et al. | |
| 2012/0051315 A1 | 3/2012 | Wang et al. | |
| 2012/0129540 A1 | 5/2012 | Hakola et al. | |
| 2013/0148538 A1 | 6/2013 | Ohwatari et al. | |
| 2013/0279428 A1* | 10/2013 | Liu | H04B 7/0456 370/329 |
| 2014/0064203 A1* | 3/2014 | Seo | H04W 28/06 370/329 |
| 2015/0038135 A1* | 2/2015 | Lu | H04L 5/005 455/426.1 |
| 2015/0131566 A1* | 5/2015 | Seo | H04B 1/3838 370/329 |

FOREIGN PATENT DOCUMENTS

| | | | |
|---|---|---|---|
| CN | 101958770 A | * | 1/2011 |
| CN | 102365897 A | | 2/2012 |
| CN | 102724675 A | | 10/2012 |
| EP | 2413515 A2 | | 2/2012 |
| JP | 2012231218 A | | 11/2012 |
| WO | WO 2009147570 A1 | | 12/2009 |
| WO | WO 2010084411 A1 | | 7/2010 |
| WO | WO 2010125427 A1 | | 11/2010 |
| WO | WO 2011018419 A1 | | 2/2011 |
| WO | WO 2012015698 A1 | | 2/2012 |
| WO | WO 2013176589 A1 | | 11/2013 |

OTHER PUBLICATIONS

Nie et al., "A Method for Interference Suppression of D2D Communication in Downlink Radio Resource of Multiplexing Cellular," Telecommunications Network Technology, Issue No. 8, pp. 54-59, China (Aug. 15, 2012).

Xu, "Interference studies LTE system after the introduction of D2D technology," Telecommunications Information, pp. 32-35, School of Communication and Information Engineering, Nanjing University of Posts and Telecommunications, Nanjing, Jiangsu Provence, China (Nov. 10, 2012).

Peng et al.,"Interterence Avoidance Mechanisms in the Hybrid Cellular and Device-to-Device Systems," Personal, Indoor and Mobile Radio Communications, 2009 IEEE 20th International Symposium (2009).

* cited by examiner

METHOD AND DEVICE FOR PROCESSING INTERFERENCE

CROSS-REFERENCE TO RELATED APPLICATIONS

This application is a continuation of International Patent Application No. PCT/CN2013/083359, filed on Sep. 12, 2013, which claims priority to Chinese Patent Application No. 201210514520.5, filed on Dec. 5, 2012, both of which are hereby incorporated by reference in their entireties.

TECHNICAL FIELD

The present invention relates to a field of communication technology, and particularly, relates to a method and device for processing interference.

BACKGROUND

At present, in most device-to-device (Device-to-Device, D2D) transmission technologies, since the number of antennas of a traditional terminal is only 1-2 in general, leading to only a limited capability of an interference elimination, D2D communication uses a frequency spectrum different from that of cellular communication. Namely, the frequency spectrums of D2D communication and cellular communication are orthogonal to each other, which is capable of avoiding mutual interference, but does not give full play to an ability of multi-antennas of the terminal, leading to a low utilization ratio of a resource.

Along with a continuous development of antenna technology, a mobile terminal in the future may have more antennas (for example up to 8 or more antennas), which can not only enhance an uplink/downlink throughput of a cellular communication, but also make the mobile terminal multiplex an uplink frequency spectrum of the cellular communication for direct communication between terminals (D2D communication). Namely, in a same frequency spectrum, an uplink user transmits a signal to a base station, and a D2D transmitting end transmits data to a D2D receiving end as well.

The practice of sharing a frequency spectrum may dramatically increase the frequency spectrum utilization ratio of a system, but will also bring mutual interference between transmissions in different modes. However, the previously mentioned interference can be eliminated in the spatial dimension by means of the capability of multi antennas of the terminal. In order to achieve a purpose of interference elimination, a D2D terminal must further have an interference-aware capability.

SUMMARY

Embodiments of the present invention provide a method and device for processing interference, which are capable of realizing the elimination of interference to a signal received by a D2D receiving end caused by a signal transmitted by an uplink user.

In a first aspect, an embodiment of the present invention provide a method for processing interference, the method including:

measuring, according to a first demodulation reference signal DMRS pilot symbol carried by a first subcarrier used by an uplink user equipment, an interference channel matrix of an uplink interference channel from the uplink user equipment to a D2D receiving end, wherein the first subcarrier is a subcarrier shared by a D2D transmitting end and the uplink user equipment;

calculating a null space matrix of the uplink interference channel according to the interference channel matrix; and processing, by using the null space matrix, a signal which comes from a D2D transmitting end and received by the D2D receiving end via the first subcarrier, to eliminate an interference signal, which comes from the uplink user equipment, in the signal.

In a second aspect, an embodiment of the present invention provide a device for processing interference, the device including:

a measuring unit, configured to measure, according to a first demodulation reference signal DMRS pilot symbol carried by a first subcarrier used by an uplink user equipment, an interference channel matrix of an uplink interference channel from uplink user equipment to a D2D receiving end, wherein the first subcarrier is a shared subcarrier of a D2D transmitting end and the uplink user equipment, and the uplink interference channel matrix is sent to a calculating unit;

the calculating unit, configured to receive the interference channel matrix sent by the measuring unit, calculate a null space matrix of the uplink interference channel according to the interference channel matrix, and send the null space matrix to a processing unit; and the processing unit, configured to receive the null space matrix sent by the calculating unit, and process, by using the null space matrix, a signal which comes from a D2D transmitting end and received by the D2D receiving end via the first subcarrier, to eliminate an interference signal, which comes from the uplink user equipment, in the signal.

In an embodiment of the present invention, according to a first demodulation reference signal DMRS pilot symbol carried by a first subcarrier used by uplink user equipment, an interference channel matrix of an uplink interference channel from the uplink user equipment to a D2D receiving end is measured, wherein the first subcarrier is a subcarrier shared by a D2D transmitting end and the uplink user equipment; the null space matrix of the uplink interference channel is calculated according to the interference channel matrix; and a signal which comes from the D2D transmitting end and received by the D2D receiving end via the first subcarrier is processed by using that null space matrix to eliminate an interference signal, which comes from the uplink user equipment, in the signal. Thus, when an uplink frequency spectrum is multiplexed by a D2D transmission, it is unnecessary for a D2D transmitting end to consider how to avoid the interference of an uplink user at a D2D receiving end, thereby greatly simplifying a demand of perception on the uplink frequency spectrum in the D2D transmission.

DESCRIPTION OF EMBODIMENTS

To make an objective, technical solution and advantage of the present invention clearer, embodiments of the present invention are further described in detail below in combination with accompanying drawings.

To facilitate illustration, the present application assumes that the cellular system uses an LTE protocol or an evolved version of the LTE protocol, but the protection scope of the method and device provided by embodiments of the present invention is not limited therein, and it is applicable to other cellular systems.

To make embodiments of the present invention clearer, an application environment for an embodiment of the present invention will be specifically introduced herein at first.

In a cellular system, an uplink user of a cellular system transmits a signal to a base station in a multi-carrier transmission mode via an uplink frequency spectrum, namely various carriers of an uplink frequency spectrum may be allocated to different users for an uplink transmission. For example, in an LTE system, different uplink users use different OFDM subcarriers. A device-to-device (D2D) transmitting end may use some carriers of an uplink frequency spectrum to transmit a signal to a D2D receiving end, a D2D transmitting end may also occupy subcarriers of several uplink users at the same time, and a D2D receiving end knows beforehand carrier(s) used by a D2D transmitting end when data is transmitted. For example, when D2D communication multiplexes an LTE uplink frequency spectrum, D2D communication also uses an OFDM transmission mode, and an OFDM symbol is synchronous with the OFDM symbol of an uplink communication. In this way, it is possible that both a signal of D2D communication and a signal of uplink communication exist in a same subcarrier.

In most cases, a D2D transmitting end does not have or cannot use a relevant measure to avoid interference (namely, a subcarrier of an uplink user far away from itself is used), and a D2D receiving end may, in the carrier it used, not only receive a signal of a D2D transmitting end, but also receive a strong signal of an uplink user. However, the latter one is an interference signal for a D2D receiving end, and an interference procession is needed by means of multi antennas of a terminal. To facilitate illustration, a channel from an uplink user to a D2D receiving end is hereinafter referred to as an uplink interference channel, and a channel from a D2D transmitting end to a D2D receiving end is hereinafter referred to as a D2D channel.

A key to performing an uplink interference procession and a D2D signal detection by using a antenna capability of a terminal is to acquire information of channels from an uplink user and a D2D transmitting end, which occupy a same subcarrier, to a D2D receiving end. Since a D2D signal and an uplink signal is on the same subcarrier and a D2D receiving end may not be aware of a specific pilot sequence transmitted by an uplink user, it is difficult to detect information of a channel from an uplink user to a D2D receiving end by using a traditional method, and thus an interference signal in a signal cannot be eliminated.

Figure 1:
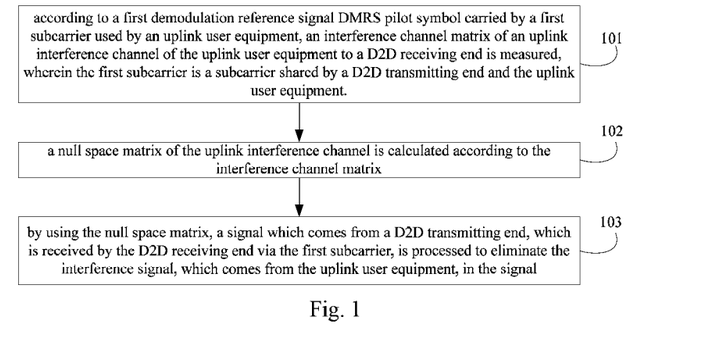
FIG. 1 is a flowchart of a method for processing interference provided by embodiment 1 of the present invention.

FIG. 1 is a flowchart of a method for processing interference provided by embodiment 1 of the present invention. As shown in FIG. 1, the method provided by the embodiment of the present invention includes:

S101, according to a first demodulation reference signal DMRS pilot symbol carried by a first subcarrier used by an uplink user equipment, an interference channel matrix of an uplink interference channel of the uplink user equipment to a D2D receiving end is measured, wherein the first subcarrier is a subcarrier shared by a D2D transmitting end and the uplink user equipment. Specifically, an uplink interference channel may be characterized by a channel matrix thereof. Therefore, in order to be able to measure the channel matrix of an uplink interference channel, a D2D receiving end has to be aware of the first subcarrier used by uplink user equipment and the first DMRS pilot symbol used by the first subcarrier. In addition, although a D2D receiving end may determine an initial position of the first DMRS pilot sequence, it cannot be aware of a length thereof. Therefore, it is necessary to acquire the length of the first DMRS pilot sequence at first, and according to the length thereof, determine the first DMRS pilot sequence and the first subband, thereby selecting the first subcarrier from the first subband and selecting the first DMRS pilot symbol from the first DMRS pilot sequence, wherein the first sub-band is composed of all subcarriers of shared by the D2D transmitting end and the uplink user equipment.

Taking an LTE cellular system as an example, in the LTE cellular system, DMRS pilot sequences with different lengths have different structures, namely, first K symbols of the DMRS pilot sequences with different lengths are not identical. Therefore, the DMRS pilot sequence actually used by an uplink interference user can be estimated by comparing the first K symbols of the DMRS pilot sequence actually received by a D2D receiving end with the first K symbols of existing and known DMRS with deferent lengths. The specific method is as follows.

Firstly, the length of the first DMRS pilot sequence can be calculated according to first K symbols of the DMRS pilot sequence which the uplink user equipment may use and first K symbols of the first DMRS pilot sequence which is actually received.

Namely, $E^{L_i}$ may be calculated according to a formula $E^{L_i}=\min_x|Y-V^{L_i}X|$, wherein $L_i$ is a length of a DMRS pilot sequence which the uplink user equipment may use, $1 \le i \le n$, n is the number of kinds of DMRS pilot sequences with different lengths, the DMRS pilot sequence which an uplink user equipment may use is just the length of an existing and known pilot sequence, Y is a column vector with K*1 dimensions, which is composed of the first K symbols of the first DMRS pilot sequence which is actually received, $V^{L_i}$ is the matrix $V^{L_i}=[V_1^{L_i}, V_2^{L_i}, \ldots, V_m^{L_i}]$ composed of first K symbols of m DMRS pilot sequences with a length of $L_i$, which the uplink user equipment may use, m is the number of different DMRS pilot sequences with the length of $L_i$, X is a column vector with m×1 dimensions, which makes $|Y-V^{L_i}X|$ achieve a minimum value, and $E^{L_i}$ is the minimum value of $|Y-V^{L_i}X|$. Namely, whenever a pilot sequence length $L_i$ is determined, an X which makes $|Y-V^{L_i}X|$ achieve the minimum value may be estimated according to the formula $E^{L_i}=\min_x|Y-V^{L_i}X|$, wherein the minimum value is represented by $E^{L_i}$.

After all possible $E^{L_i}$ are calculated out via the aforesaid process, $L_i$ which makes $E^{L_i}$ achieve a minimum value can be calculated according to the formula $L^*=\arg\min_{L_i} E^{L_i}$, wherein the L* is the length of the first DMRS pilot sequence.

Next, X which makes $|Y-V^{L^*}X|$ achieve a minimum value may be calculated according to the length L* of a first DMRS pilot sequence and a formula $X^*=\arg\min_x|Y-V^{L^*}X|$, wherein m is the number of different DMRS pilot sequences with a length of L*, Y is a column vector with K*1 dimensions, which is composed of the first K symbols of the first DMRS pilot sequence which is actually received, X* and X are column vectors with m×1 dimensions, $X^*=[x_1, x_2, \ldots, x_m]^T$, $V^{L^*}$ is a matrix composed of first K symbols of m DMRS pilot sequences with the length of L*, which are available by the uplink user equipment, $V^{L^*}=[V_1^{L^*}, V_2^{L^*}, \ldots, V_m^{L^*}]$, $V^{L^*}X^*=x_1V_1^{L^*}+x_2V_2^{L^*}+\ldots+x_iV_1^{L^*}+\ldots+x_mV_m^{L^*}$, and $1 \le i \le m$. A module value of each element in X* is calculated, and a vector $V_i^{L*}$ in $V^{L*}$ corresponding to the element $x_i$ with the minimum module value is taken as the first DMRS pilot sequence.

Since each subcarrier corresponds to one symbol of the DMRS pilot sequence, the number of subcarriers included in the first sub-band used by the uplink user equipment may be calculated according to the length L* of the first DMRS pilot sequence, thereby the first sub-band may be determined.

At last, the first subcarrier is selected from a first subband, and the first DMRS pilot symbol is selected from a first DMRS pilot sequence, and the interference channel matrix is measured according to the first subband and the DMRS pilot symbol.

It should be noted that the interference channel matrix of each uplink interference channel, which each subcarrier, shared by a D2D transmitting end and uplink user equipment, corresponds to, has to be measured.

Optionally, before the step S101, a D2D receiving end may also receive a signal which comes from a D2D transmitting end and a signal which comes from the uplink user equipment. In order to make a D2D receiving end detect the channel from uplink user equipment to itself, the structure of the signal received by a D2D receiving end is characterized as follows.

In a time dimension, a structure of the signal is consistent with that of a signal which comes from uplink user equipment, namely the signal received by a D2D receiving end is organized in a manner of a subframe, and the subframe coincides with the subframe from uplink user equipment in time dimension. And the positions of the DMRS pilot sequences in the signal which comes from the D2D transmitting end and the signal which comes from the uplink user equipment, both of which are received by a D2D receiving end, do not overlap with each other.

Figure 2:
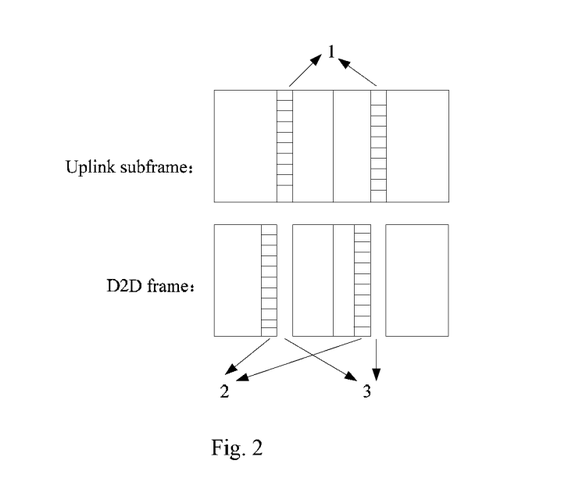
FIG. 2 is a structural schematic diagram of an uplink subframe and a D2D frame in an LTE system provided by embodiment 1 of the present invention.

Preferably, in order to better perform a detection of an uplink interference channel of an uplink user equipment, in the signal which comes from the uplink user equipment and received by a D2D receiving end, in a position with a DMRS pilot sequence, a corresponding received signal which comes from the D2D transmitting end is silent in the position. FIG. 2 is a structural schematic diagram of an uplink subframe and a D2D frame in an LTE system provided by embodiment 1 of the present invention. As shown in FIG. 2, "1" in FIG. 2 represents a DMRS pilot sequence of an uplink subframe, "2" represents a DMRS pilot sequence of a D2D frame, "3" represents the D2D frame is silent where the DMRS pilot sequence of an uplink subframe lies. It can be known that one uplink subframe is composed of several OFDM symbols, wherein in the received signal which comes from the uplink user equipment, in positions of DMRS pilot sequences in two OFDM symbols of a subframe, a corresponding signal which comes from the D2D transmitting end and received by the corresponding D2D receiving end is kept silent on the OFDM symbols.

S102, a null space matrix of the uplink interference channel is calculated according to the interference channel matrix.

Specifically, the null space matrix can be calculated according to a formula Q*H=0, wherein Q is the null space matrix, H is the interference channel matrix.

It should be noted that, a null space matrix of each uplink interference channel corresponding to each subcarrier shared by the D2D transmitting end and the uplink user equipment needs to be calculated.

S103, by using the null space matrix, a signal which comes from a D2D transmitting end, which is received by the D2D receiving end via the first subcarrier, is processed to eliminate the interference signal, which comes from the uplink user equipment, in the signal.

Specifically, the D2D receiving end may multiply the signal received via the first subcarrier, which comes from the D2D transmitting end, with the null space matrix of the uplink interference channel corresponding to the subcarrier, and then perform a D2D channel detection and signal detection. Since the D2D signal detection is performed in the null space of the uplink interference channel, the uplink interference has been eliminated.

In the embodiment of the present invention, the D2D receiving end measures the interference channel matrix of the uplink interference channel from the uplink user equipment to the D2D receiving end according to the first demodulation reference signal DMRS pilot symbol carried by the first subcarrier used by the uplink user equipment, wherein the first subcarrier is a subcarrier shared by the D2D transmitting end and the uplink user equipment; calculates the null space matrix of the uplink interference channel according to the interference channel matrix; processes, by using the null space matrix, the signal received by the D2D receiving end via the first subcarrier, which comes from the D2D transmitting end, to eliminate the interference signal, which comes from the uplink user equipment, in the signal. Therefore, when an uplink frequency spectrum is multiplexed by a D2D transmission, it is unnecessary for the D2D transmitting end to consider how to avoid the interference of the uplink user equipment at the D2D receiving end, which greatly simplifying a demand of perception on the uplink frequency spectrum in the D2D transmission. In addition, positions of DMRS pilot sequences in signals received by the D2D receiving end, which comes from the D2D transmitting end and from the uplink user equipment, are not overlapped, which could reduce the interference caused during the detection of the uplink interference channel.

Figure 3:
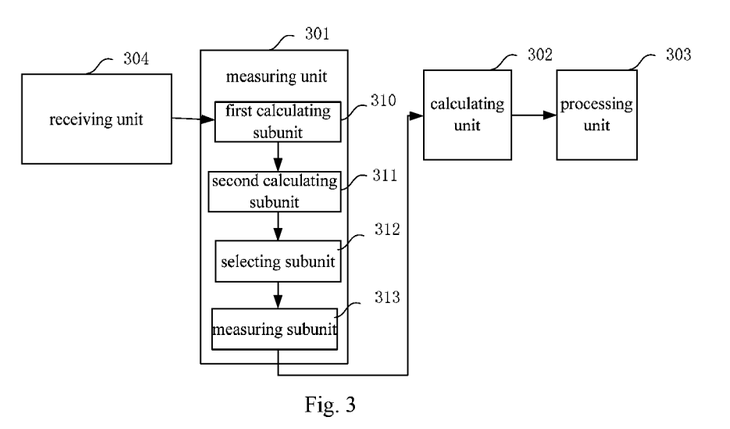
FIG. 3 is a schematic diagram of a device for processing interference provided by embodiment 2 of the present invention.

Accordingly, an embodiment of the present invention provide a device for processing interference. FIG. 3 is a schematic diagram of a device for processing interference provided by embodiment 2 of the present invention. As shown in FIG. 3, the device includes: a measuring unit 301, a calculating unit 302 and a processing unit 303.

The measuring unit 301 is configured to measure, according to a first demodulation reference signal DMRS pilot symbol carried by a first subcarrier used by an uplink user equipment, an interference channel matrix of an uplink interference channel from the uplink user equipment to a D2D receiving end, wherein the first subcarrier is a subcarrier shared by a D2D transmitting end and the uplink user equipment.

It should be noted that the uplink interference channel may be characterized by an interference channel matrix, and the interference channel matrix of each uplink interference channel to which each subcarrier shared by a D2D transmitting end and an uplink user equipment corresponds has to be measured.

The calculating unit 302 is configured to calculate a null space matrix of the uplink interference channel according to the interference channel matrix.

Specifically, the calculating unit 302 calculates a null space matrix according to a formula Q*H=0, in which Q is the null space matrix, H is the interference channel matrix.

It should be noted that, the null space matrix of each uplink interference channel corresponding to each subcarrier shared by the D2D transmitting end and the uplink user equipment needs to be calculated.

The processing unit 303 is configured to process, by using the null space matrix, a signal which comes from a D2D transmitting end and received by the D2D receiving end via the first subcarrier, to eliminate the interference signal, which comes from the uplink user equipment, in the signal.

Specifically, the D2D receiving end may multiply the signal received via the first subcarrier, which comes from the D2D transmitting end, with the null space matrix of the uplink interference channel corresponding to the subcarrier, and then perform a D2D channel detection and signal detection. Since the D2D signal detection is performed in the null space of the uplink interference channel, the uplink interference has been eliminated.

The measuring unit 301 provided by embodiments of the present invention specifically includes: a first calculating subunit 310, a second calculating subunit 311, a selecting subunit 312 and a measuring subunit 313.

The first calculating subunit 310 is configured to calculate a length of a first DMRS pilot sequence according to first K symbols of a first DMRS pilot sequence which is available by the uplink user equipment and first K symbols of the first DMRS pilot sequence which is actually received.

An uplink interference channel may be characterized by a channel matrix. Therefore, in order to be able to measure the interference channel matrix of an uplink interference channel, a D2D receiving end has to be aware of the first subcarrier used by uplink user equipment and the first DMRS pilot symbol used by the first subcarrier. In addition, although a D2D receiving end may determine an initial position of the first DMRS pilot sequence, it cannot be aware of a length thereof. Therefore, it is necessary to acquire the length of the first DMRS pilot sequence at first, and determine the first DMRS pilot sequence and the first subband according to the length thereof, thereby selecting the first subcarrier from the first subband and selecting the first DMRS pilot symbol from the first DMRS pilot sequence, wherein the first sub-band is composed of all subcarriers shared by the D2D transmitting end and the uplink user equipment.

Specifically, the first calculating subunit 310 calculates the $E^{L_i}$ according to a formula $E^{L_i}=\min_x|Y-V^{L_i}X|$, in which $L_i$ is a length of a DMRS pilot sequence which the uplink user equipment may use, $1\leq i\leq n$, n is the number of kinds of DMRS pilot sequences with different lengths, the DMRS pilot sequence which uplink user equipment may use is just a length of an existing and known pilot sequence, Y is a column vector with K*1 dimensions, which is composed of the first K symbols of the first DMRS pilot sequence which is actually received, $V^{L_i}$ is the matrix $V^{L_i}=[V_1^{L_i}, V_2^{L_i}, \ldots, V_m^{L_i}]$ composed of first K symbols of m DMRS pilot sequences with a length of $L_i$, which the uplink user equipment may use, m is the number of different DMRS pilot sequences with the length of $L_i$, X is a column vector with m×1 dimensions, which makes $|Y-V^{L_i}X|$ achieve a minimum value, and $E^{L_i}$ is the minimum value of $|Y-V^{L_i}X|$. Namely, whenever a pilot sequence length $L_i$ is determined, X which makes $|Y-V^{L_i}X|$ achieve a minimum value may be estimated according to a formula $E^{L_i}=\min_x|Y-V^{L_i}X|$, and the minimum value is represented by $E^{L_i}$.

After all possible $E^{L_i}$ are calculated out by the aforesaid process, $L_i$ which makes $E^{L_i}$ achieve the minimum value can be calculated according to a formula $L^*=\mathrm{argmin}_{L_i} E^{L_i}$, wherein $L^*$ is the length of the first DMRS pilot sequence. The second calculating subunit 311 is configured to calculate the positions of the first DMRS pilot sequence and first subband according to the length of the first DMRS pilot sequence, wherein the first subband is composed of a subcarrier shared by the D2D transmitting end and the uplink user equipment.

Specifically, the second calculating subunit 311 calculates the X which makes $|Y-V^{L^*}X|$ achieve a minimum value according to a formula $X^*=\mathrm{arg}\min_x|Y-V^{L^*}X|$, where $L^*$ is the length of the first DMRS pilot sequence, m is the number of different DMRS pilot sequences each with a length of $L^*$, Y is a column vector with K*1 dimensions, which is composed of the first K symbols of the first DMRS pilot sequence which is actually received, $X^*$ and X are column vectors with m×1 dimensions, $X^*=[x_1, x_2, \ldots, x_m]^T$, $V^{L^*}$ is a matrix composed of first K symbols of m DMRS pilot sequences each with a length of $L^*$, which is available by uplink user equipment, $V^{L^*}=[V_1^{L^*}, V_2^{L^*}, \ldots, V_m^{L^*}]$, $V^{L^*}X^*=x_1V_1^{L^*}+x_2V_2^{L^*}+\ldots+x_iV_i^{L^*}+\ldots+x_mV_m^{L^*}$, and $1\leq i\leq m$. A module value of each element in $X^*$ is calculated, and a vector $V_i^{L^*}$ in the $V^{L^*}$ corresponding to the element $x_i$, with the minimum module value is taken as the first DMRS pilot sequence.

Since each subcarrier corresponds to one symbol of the DMRS pilot sequence, the number of the subcarriers included in the first subband used by the uplink user equipment may be calculated according to the length $L^*$ of the first DMRS pilot sequence, so that the first sub-band can be determined.

The selecting subunit 312 is configured to select the first subcarrier from the first subband, and select the first DMRS pilot symbol from the first DMRS pilot sequence.

The measuring subunit 313 is configured to measure the interference channel matrix according to the first subband and the DMRS pilot symbol.

Optionally, the device further includes a receiving unit 304 for receiving a signal which comes from the D2D transmitting end and a signal which comes from the uplink user equipment.

The signal which comes from the D2D transmitting end and the signal which comes from the uplink user equipment, both of which are received by receiving unit 304, are synchronous in time and consistent in structure. The positions of the DMRS pilot sequences in the signal which comes from the D2D transmitting end and the signal which comes from the uplink user equipment, both of which are received by the receiving unit 304 do not overlap with each other.

Preferably, in order to better perform the uplink interference channel detection of the uplink user equipment, in the signal which comes from uplink user equipment and received by the receiving unit 304, in the position with a DMRS pilot sequence, a corresponding received signal which comes from the D2D transmitting end as received is silent in the position.

In the embodiment of the present invention, the D2D receiving end measures the interference channel matrix of the uplink interference channel from the uplink user equipment to the D2D receiving end according to the first demodulation reference signal DMRS pilot symbol carried by the first subcarrier used by the uplink user equipment, wherein the first subcarrier is a subcarrier shared by the D2D transmitting end and the uplink user equipment; calculates the null space matrix of the uplink interference channel according to the interference channel matrix; processes, by using the null space matrix, the signal received by the D2D receiving end via the first subcarrier, which comes from the D2D transmitting end, to eliminate the interference signal, which comes from the uplink user equipment, in the signal. Therefore, when an uplink frequency spectrum is multiplexed by a D2D transmission, it is unnecessary for the D2D transmitting end to consider how to avoid the interference of the uplink user equipment at the D2D receiving end, which greatly simplifying a demand of perception on the uplink frequency spectrum in the D2D transmission. In addition, positions of DMRS pilot sequences in signals received by the D2D receiving end, which comes from the D2D transmitting end and from the uplink user equipment, are not overlapped, which could reduce the interference caused during the detection of the uplink interference channel.

Those skilled in the art may further appreciate that the units and algorithm steps of various examples as described in conjunction with the embodiments disclosed herein can be implemented by electronic hardware, computer software, or the combination of both. To clearly illustrate this interchangeability of hardware and software, in the above description, the composition and procedures of the examples have been described generally according to functionality. Whether these functions are implemented in the form of hardware or software is determined by specific applications and design constraint conditions of the technical solutions. Those skilled in the art may use different methods for each particular application to achieve the described functionality, but such implementation should not be considered as beyond the scope of the present invention.

The method or algorithm steps described in conjunction with the embodiments disclosed herein can be executed by hardware, a software module executed by a processor, or the combination of the two. A software module may be placed in Random Access Memory (RAM), Read Only Memory (ROM), electrically programmable ROM, electrically erasable programmable ROM, register, hard disk, removable disk, CD-ROM, or any other form of storage media as known in the technical field.

In the embodiments described above, the objectives, technical solutions and the beneficial effects of the present invention were described in further detail. It should be understood that the above embodiments are only exemplary embodiments for illustrating the principle of the present invention; however, the present invention is not limited thereto. Various variations and improvements can be made by the person skilled in the art without departing from the spirit and essence of the present invention, and these variations and improvements should also be considered to be within the protection scope of the present invention.

What is claimed is:

1. A method for processing interference, comprising:
   measuring, according to a first demodulation reference signal (DMRS) pilot symbol carried by a first subcarrier used by an uplink user equipment, an interference channel matrix of an uplink interference channel from the uplink user equipment to a device-to-device (D2D) receiving end, wherein the first subcarrier is a subcarrier shared by a D2D transmitting end and the uplink user equipment, wherein the first DMRS pilot symbol is selected from a first DMRS pilot sequence which is used by the uplink user equipment, and the first DMRS pilot sequence is estimated by the D2D receiving end by comparing a first K symbols of a DMRS pilot sequence which is available to the uplink user equipment and a first K symbols of the first DMRS pilot sequence which is actually received by the D2D receiving end;
   calculating a null space matrix of the uplink interference channel according to the interference channel matrix; and
   processing, by using the null space matrix, a signal which comes from a D2D transmitting end and received by the D2D receiving end via the first subcarrier, to eliminate an interference signal, which comes from the uplink user equipment, in the signal.

2. The method for processing interference according to claim 1, wherein the measuring, according to the first demodulation reference signal (DMRS) pilot symbol carried by the first subcarrier used by the uplink user equipment, the interference channel matrix of the uplink interference channel from the uplink user equipment to the device-to-device (D2D) receiving end comprises:
   calculating a length of the first DMRS pilot sequence according to the first K symbols of a DMRS pilot sequence which is available by the uplink user equipment and the first K symbols of the first DMRS pilot sequence which is actually received;
   calculating, according to the length of the first DMRS pilot sequence, the first DMRS pilot sequence and a first subband, wherein the first subband is composed of subcarrier(s) shared by the D2D transmitting end and the uplink user equipment;
   selecting the first subcarrier from the first subband, and selecting the first DMRS pilot symbol from the first DMRS pilot sequence; and
   measuring the interference channel matrix according to the first subcarrier and the first DMRS pilot symbol.

3. The method for processing interference according to claim 2, wherein the calculating the length of the first DMRS pilot sequence according to the first K symbols of the DMRS pilot sequence which is available by the uplink user equipment and the first K symbols of the first DMRS pilot sequence which is actually received comprises:
   calculating $E^{L_i}$ according to a formula $E^{L_i}=\min_X|Y-V^{L_i}X|$, in which $L_i$ is a length of a DMRS pilot sequence which is available by the uplink user equipment, $1 \leq i \leq n$, n is the number of kinds of DMRS pilot sequences with different lengths, Y is a column vector with K*1 dimensions, which is composed of the first K symbols of the first DMRS pilot sequence which is actually received, $V^{L_i}$ is the matrix $V^{L_i}=[V_1^{L_i}, V_2^{L_i}, \ldots, V_m^{L_i}]$ composed of first K symbols of m DMRS pilot sequences with a length of $L_i$, which are available by the uplink user equipment, m is the number of different DMRS pilot sequences with the length of $L_i$, X is a column vector with m×1 dimensions, which makes $|Y-V^{L_i}X|$ achieve a minimum value, and $E^{L_i}$ is the minimum value of $|Y-V^{L_i}X|$; and
   calculating $L_i$ which makes $E^{L_i}$ achieve a minimum value according to a formula $L^*=\arg\min_{L_i} E^{L_i}$, wherein the $L^*$ is the length of the first DMRS pilot sequence.

4. The method for processing interference according to claim 2, wherein the calculating the first DMRS pilot sequence according to the length of the first DMRS pilot sequence comprises:
   calculating X which makes $|Y-V^{L^*}X|$ achieve a minimum value according to a formula $X^*=\arg\min_X|Y-V^{L^*}X|$, wherein $L^*$ is the length of the first DMRS pilot sequence, m is the number of different DMRS pilot sequences with a length of $L^*$, Y is a column vector with K*1 dimensions, which is composed of the first K symbols of the first DMRS pilot sequence which is actually received, $X^*$ and X are column vectors with m×1 dimensions, $X^*=[x_1, x_2, \ldots, x_m]^T$, $V^{L^*}$ is a matrix composed of first K symbols of m DMRS pilot sequences with the length of $L^*$, which is available by the uplink user equipment, $V^{L^*}=[V_1^{L^*}, V_2^{L^*}, \ldots, V_m^{L^*}]$, $V^{L^*}X^* = x_1 V_1^{L^*} + x_2 V_2^{L^*} + \ldots + x_i V_i^{L^*} + \ldots + x_m V_m^{L^*}$, and $1 \leq i \leq m$; and calculating a module value of each element in the X*, and taking the vector $V_i^{L^*}$ in $V^{L^*}$ to which an element $x_i$ with a minimum module value corresponds as the first DMRS pilot sequence.

5. The method for processing interference according to claim 1, wherein the calculating the null space matrix of the uplink interference channel according to the interference channel matrix of the uplink interference channel comprises: calculating the null space matrix according to a formula Q*H=0, wherein Q is the null space matrix, and H is the interference channel matrix.

6. The method for processing interference according to claim 1, wherein the processing, by using the null space matrix, the signal, which comes from the D2D transmitting end and received by the D2D receiving end via the first subcarrier, to eliminate the interference signal, which comes from the uplink user equipment, in the signal comprises: multiplying the null space matrix with the signal received by the D2D receiving end via the first subcarrier to eliminate the interference signal, which comes from the uplink user equipment, in the signal.

7. The method for processing interference according to claim 1, wherein before the measuring, according to the first demodulation reference signal (DMRS) pilot symbol carried by the first subcarrier used by the uplink user equipment, the interference channel matrix of the uplink interference channel from the uplink user equipment to the device-to-device (D2D) receiving end, further comprising: receiving a signal which comes from a D2D transmitting end and a signal which comes from the uplink user equipment.

8. The method for processing interference according to claim 7, wherein the received signal which comes from the D2D transmitting end and signal which comes from the uplink user equipment are synchronous in time and consistent in structure.

9. The method for processing interference according to claim 8, wherein positions of the DMRS pilot sequence of the received signal which comes from the D2D transmitting end and that of the signal which comes from the uplink user equipment do not overlap with each other.

10. The method for processing interference according to claim 9, wherein in the received signal which comes from the uplink user equipment, in a position where there is a DMRS pilot sequence, a corresponding received signal which comes from the D2D transmitting end is silent in the position.

11. A device for processing interference, comprising: a processor and a memory,
wherein the memory is configured to store program code, the processor is configured to execute the program code in the memory to perform the following operations:
measuring, according to a first demodulation reference signal (DMRS) pilot symbol carried by a first subcarrier used by an uplink user equipment, an interference channel matrix of an uplink interference channel from uplink user equipment to a D2D receiving end, wherein the first subcarrier is a shared subcarrier of a D2D transmitting end and the uplink user equipment, wherein the first DMRS pilot symbol is selected from a first DMRS pilot sequence which is used by the uplink user equipment, and the first DMRS pilot sequence is estimated by the D2D receiving end by comparing a first K symbols of a DMRS pilot sequence which is available to the uplink user equipment and a first K symbols of the first DMRS pilot sequence which is actually received by the D2D receiving end;

calculating a null space matrix of the uplink interference channel according to the interference channel matrix; and processing, by using the null space matrix, a signal which comes from a D2D transmitting end and received by the D2D receiving end via the first subcarrier, to eliminate an interference signal, which comes from the uplink user equipment, in the signal.

12. The device for processing interference according to claim 11, wherein the measuring, according to the first DMRS pilot symbol carried by the first subcarrier used by the uplink user equipment, the interference channel matrix of the uplink interference channel from the uplink user equipment to the D2D receiving end comprises:

calculating the length of a first DMRS pilot sequence according to the first K symbols of a DMRS pilot sequence which is available by the uplink user equipment and the first K symbols of the first DMRS pilot sequence which is actually received;

calculating, according to the length of the first DMRS pilot sequence, positions of the first DMRS pilot sequence and a first subband, wherein the first subband is composed of subcarrier(s) shared by the D2D transmitting end and the uplink user equipment;

selecting the first subcarrier from the first subband, and selecting the first DMRS pilot symbol from the first DMRS pilot sequence; and measuring the interference channel matrix according to the first subcarrier and the first DMRS pilot symbol.

13. The device for processing interference according to claim 12, wherein the calculating the length of the first DMRS pilot sequence according to the first K symbols of the DMRS pilot sequence which is available by the uplink user equipment and the first K symbols of the first DMRS pilot sequence which is actually received comprises:

calculating $E^{L_i}$ according to a formula $E^{L_i} = \min_X |Y - V^{L_i} X|$, in which $L_i$ is a length of a DMRS pilot sequence which is available by the uplink user equipment, $1 \leq i \leq n$, n is the number of kinds of DMRS pilot sequences with different lengths, Y is a column vector with K*1 dimensions, which is composed of the first K symbols of the first DMRS pilot sequence which is actually received, $V^{L_i}$ is the matrix $V^{L_i} = [V_1^{L_i}, V_2^{L_i}, \ldots, V_m^{L_i}]$ composed of first K symbols of m DMRS pilot sequences with a length of $L_i$, which are available by the uplink user equipment, m is the number of different DMRS pilot sequences with the length of $L_i$, X is a column vector with m×1 dimensions, which makes $|Y - V^{L_i} X|$ achieve a minimum value, and $E^{L_i}$ is the minimum value of $|Y - V^{L_i} X|$; and calculating $L_i$ which makes $E^{L_i}$ achieve a minimum value according to a formula $L^* = \arg \min_{L_i} E^{L_i}$, wherein L* is the length of the first DMRS pilot sequence.

14. The device for processing interference according to claim 12, wherein the calculating, according to the length of the first DMRS pilot sequence, the positions of the first DMRS pilot sequence and the first subband comprises:

calculating X which makes $|Y - V^{L^*} X|$ achieve a minimum value according to a formula $X^* = \arg \min_X |Y - V^{L^*} X|$, wherein L* is the length of the first DMRS pilot sequence, m is the number of different DMRS pilot sequences with a length of L*, Y is a column vector with K*1 dimensions, which is composed of the first K symbols of the first DMRS pilot sequence which is actually received, X* and X are column vectors with m×1 dimensions, $X^*=[x_1, x_2, \ldots, x_m]^T$, $V^{L^*}$ is a matrix composed of first K symbols of m DMRS pilot sequences with the length of L*, which is available by uplink user equipment, $V^{L^*}=[V_1^{L^*}, V_2^{L^*}, \ldots, V_m^{L^*}]$, $V^{L^*}X^*=x_1V_1^{L^*}+x_2V_2^{L^*}+ \ldots +x_iV_i^{L^*}+ \ldots +x_mV_m^{L^*}$, and $1 \leq i \leq m$; and calculating a module value of each element in the X*, and takes the vector $V_i^{L^*}$ in $V^{L^*}$ to which an element $x_i$ with a minimum module value corresponds as the first DMRS pilot sequence.

15. The device for processing interference according to claim 11, wherein the calculating the null space matrix of the uplink interference channel according to the interference channel matrix comprises:

calculating the null space matrix according to a formula Q*H=0, wherein Q is the null space matrix, and H is the interference channel matrix.

16. The device for processing interference according to claim 11, wherein the processing, by using the null space matrix, the signal which comes from the D2D transmitting end and received by the D2D receiving end via the first subcarrier, to eliminate the interference signal, which comes from the uplink user equipment, in the signal comprises:

multiplying the null space matrix with the signal, which comes from a D2D transmitting end and received by the D2D receiving end via the first subcarrier, to eliminate the interference signal, which comes from the uplink user equipment, in the signal.

17. The device for processing interference according to claim 11, wherein the processor is further configured to execute the following operation:

receiving a signal which comes from the D2D transmitting end and a signal which comes from the uplink user equipment.

18. The device for processing interference according to claim 17, wherein the signal which comes from the D2D transmitting end and signal which comes from the uplink user equipment are synchronous in time and consistent in structure.

19. The device for processing interference according to claim 18, wherein positions of the DMRS pilot sequence of the signal which comes from the D2D transmitting end and that of the signal which comes from the uplink user equipment do not overlap with each other.

20. The device for processing interference according to claim 19, wherein in the signal which comes from the uplink user equipment, in a position where there is a DMRS pilot sequence, a corresponding received signal which comes from the D2D transmitting end is silent in the position.

\* \* \* \* \*